US007698636B2

(12) United States Patent
Mohamed

(10) Patent No.: US 7,698,636 B2
(45) Date of Patent: Apr. 13, 2010

(54) SYSTEM AND METHOD FOR IN-CONTEXT EDITING OF COMPONENTS

(75) Inventor: Ibrahim A. Mohamed, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 10/171,296

(22) Filed: Jun. 13, 2002

(65) Prior Publication Data

US 2003/0233614 A1   Dec. 18, 2003

(51) Int. Cl.
*G06F 17/00* (2006.01)
(52) U.S. Cl. .................. 715/255; 715/234; 715/271; 715/272
(58) Field of Classification Search ............. 715/511, 715/539, 540, 530, 733, 735, 513, 500, 255, 715/271, 272, 209, 231, 234; 345/738, 733
See application file for complete search history.

(56) References Cited

U.S. PATENT DOCUMENTS

| 5,712,994 | A  | * | 1/1998 | Jefferson et al. ............ 715/788 |
| 5,801,701 | A  | * | 9/1998 | Koppolu et al. ............ 715/821 |
| 6,052,514 | A  | * | 4/2000 | Gill et al. .................... 715/500 |
| 6,088,702 | A  | * | 7/2000 | Plantz et al. ............ 707/103 R |
| 6,202,073 | B1 | * | 3/2001 | Takahashi .................... 715/204 |
| 6,516,339 | B1 | * | 2/2003 | Potts et al. .................. 709/203 |
| 6,643,663 | B1 | * | 11/2003 | Dabney et al. ............. 707/102 |
| 6,684,369 | B1 | * | 1/2004 | Bernardo et al. ............ 715/513 |
| 7,000,180 | B2 | * | 2/2006 | Balthaser .................. 715/500.1 |
| 2002/0069204 | A1 | * | 6/2002 | Kahn et al. .................... 707/10 |
| 2002/0091725 | A1 | * | 7/2002 | Skok ........................ 707/501.1 |
| 2002/0116413 | A1 | * | 8/2002 | Clark ......................... 707/513 |
| 2002/0169782 | A1 | * | 11/2002 | Lehmann et al. ............ 707/100 |
| 2002/0188635 | A1 | * | 12/2002 | Larson ....................... 707/515 |
| 2003/0014442 | A1 | * | 1/2003 | Shiigi et al. ................. 707/513 |
| 2003/0074634 | A1 | * | 4/2003 | Emmelmann ............... 715/513 |
| 2003/0115217 | A1 | * | 6/2003 | Klug .......................... 707/200 |
| 2005/0229154 | A1 | * | 10/2005 | Hiew et al. .................. 717/110 |

OTHER PUBLICATIONS

Microsoft Word Printout, copyright 1999, pp. 1-25.*
Nardini, H.K.G., et al., "Lessons for working with web designers," *Online Inc.*, Mar.-Apr. 2002, 26(2-3), 51-56.
Rosenman, M., et al., "CADOM: A component agent-based design-oriented model for collaborative design," *Research in Engineering Design*, 1999, 11, 193-205.

* cited by examiner

*Primary Examiner*—Thu Huynh
(74) *Attorney, Agent, or Firm*—Woodcock Washburn LLP

(57) ABSTRACT

A component can be edited from within the context of a hosting file. A system and method for providing an in-place editing surface for a component such as a file, document or control, within the context of the hosting file is described. A non-persistable container is generated for the hosting file and another non-persistable container (e.g., an editing frame) is generated for the component. The current contents of the component are loaded into an editing frame. Modifications made to the component within the editing frame are saved and the hosting file is displayed. Any changes made to the component are visible in the hosting file.

16 Claims, 20 Drawing Sheets

SYSTEM AND METHOD FOR IN-CONTEXT EDITING OF COMPONENTS

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright® 2002, Microsoft Corporation, All Rights Reserved.

FIELD OF THE INVENTION

This invention relates to the field of computing and in particular to the field of editing tools.

BACKGROUND

Some editors support editing files that contain files within them. As an example, suppose a Microsoft WORD file (a container object) contains an EXCEL file (a server object) within it. If a user wishes to edit the EXCEL file from within the WORD file, he or she may be able to do so by double-clicking on the EXCEL object within the WORD file. Because EXCEL and WORD require running different executables, a new instance of an EXCEL application may be launched in order to edit the EXCEL object within the WORD file. Such an operation is called "in-place activation". In-place activation typically requires the implementation of a number of interfaces (e.g., in the case of the WORD/EXCEL example described above, these interfaces are implemented using OLE technology).

Additionally, in-place activation typically requires the server object and the container object to be executables in order to enable the direct WYSIWYG ("What You See Is What You Get") editing of the server object from within the container object. Because two different executables are involved, it follows that changes that are made to the EXCEL document, such as changing the font, will not be applied to the WORD document, and similarly, changes made to the WORD document will not be applied to the EXCEL document. Hence, it is not possible to edit the EXCEL object "within the context" of the WORD document.

There are times when it would be helpful to be able to edit a component from within the context of the containing or hosting file, so that changes made to the hosting file would be automatically reflected within the component. It would similarly be helpful to be able to directly edit a component that is not necessarily an executable. It would be helpful if such a task could be implemented without the establishment of a number of highly specific interfaces so that a generic architecture could be accommodated. Furthermore, it would be helpful to find a way to accomplish this task in such a way that the user is intuitively aware of the context in which the element is being edited. This concept is referred to herein as "in-context editing".

SUMMARY OF THE INVENTION

A component can be edited from within the context of a hosting file. A system and method for providing an in-place editing surface for a component, such as but not limited to a document, file or control, from within the context of the hosting file is described. A non-persistable element (e.g., a holding element or container) is generated for storing the hosting file and another non-persistable element (e.g., a holding element such as an editing frame) is generated for storing the contents of the component. The current contents of the component are loaded into the editing frame. Modifications made to the component within the editing frame are saved, the original contents of the hosting file are restored and the hosting file is displayed with the modified component. Thus, changes made to the component are visible in the hosting file.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Exemplary Computing Environment

Figure 1:
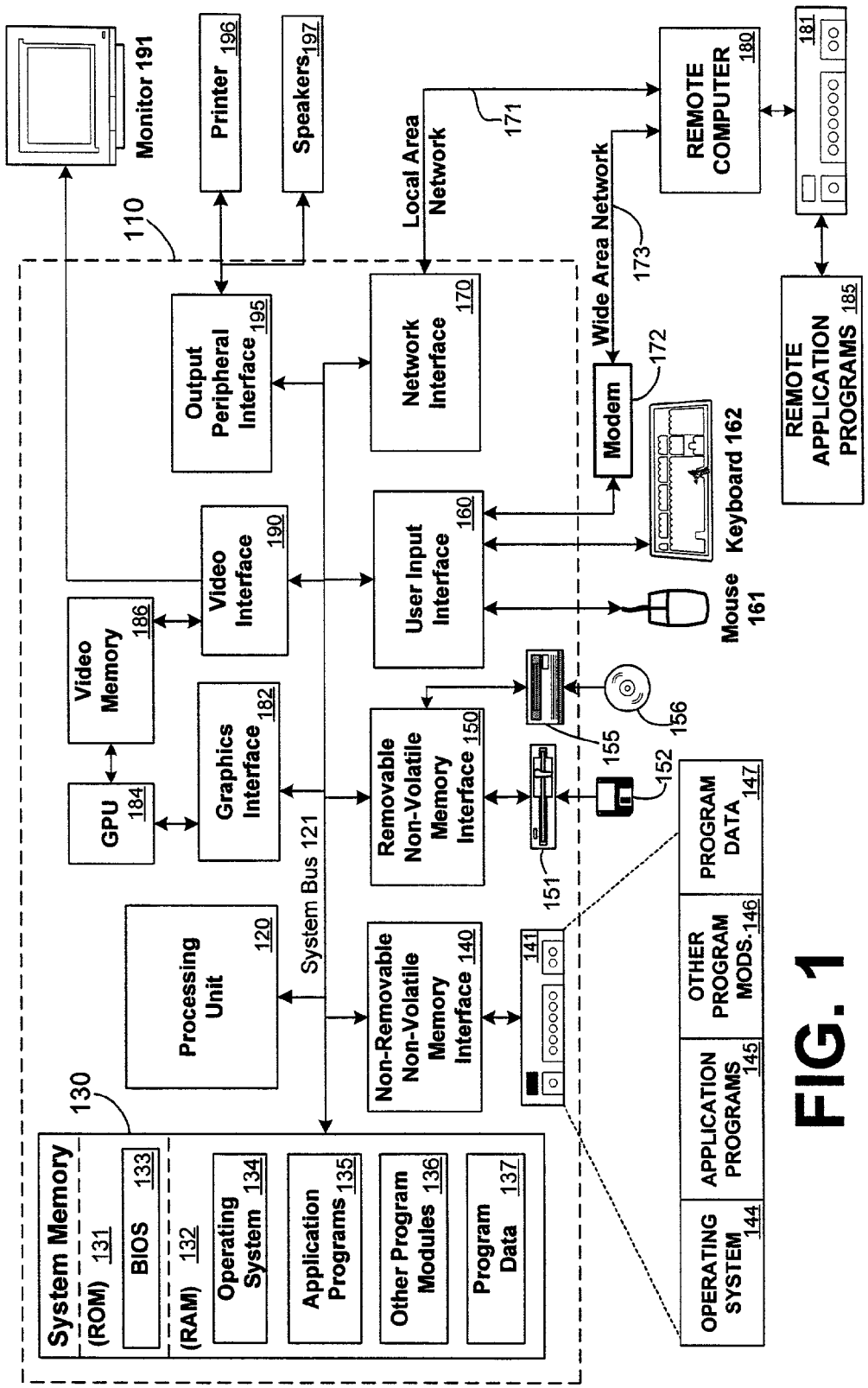
FIG. 1 is a block diagram of an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137.

Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Overview

An editor refers to software used to create and modify files. A file is contemplated to include any block of information in the form of digital data such as binary digits or bits, stored together on a computing device or external digital storage medium, and identified by a name or reference. A file, hence, may be a program, a document, a database, a control or any other entity comprising some identifiable collection of bits. Thus the term "editor" may refer to a program such as, but not limited to, a word processing program, an editor for source code and the like.

For example, within a development environment, an editor for writing source code is provided. The editor may automatically generate source code for common programming tasks. For example, a developer can automatically generate the code required to build a form by dragging and dropping fields and other components from a toolbox of pre-coded entities provided within the editor. Components available in the toolbox include controls of various types. Typically, the majority of controls available in the editor toolbox are read-only.

User controls provide a means by which custom graphical interfaces can be created and reused. A user control is essentially a component with the associated visual representation contained in a separate document (denoted, e.g., by an extension of "ascx"). As such, it might consist of one or more forms controls, components, or blocks of code that can extend functionality by validating user input, modifying display properties, or performing other tasks required by the author. User controls can be placed on forms in the same manner as other controls.

Developers customize controls by setting properties, such as but not limited to font, size, placement and by supplying application-specific "event handler" code which is invoked upon a user request or response. Some of the properties exposed by the control are simple properties, while other properties are complex. An example of a complex property is a "template". A template is a layout or user interface for a particular section of a control. For example, a calendar control might include a month and days within the month. A complex property for the calendar control might include a template describing what a month would look like and another template describing the appearance of a day.

A control originally in read-only mode may be context-switched to "template editing" mode. "Template editing" mode is a read/write mode allowing WYSIWYG authoring of the respective template.

Typically, there have been a number of problems associated with template editing. Template editing is typically implemented by creating a sub-document containing the template. The sub-document typically includes a minimal subset of the main document type, so that the full functionality of the main document is not available from within the read/write sections of the sub-document. For example, features like advanced table editing, absolute (2Dimensional) positioning, etc., available in the main document, are not available from within the template.

Typically, in template editing, because both the sub-document and the main document can be edited at the same time, operations like undo/redo, automatic generation of unique IDs for controls and the like, become unclear. This situation leads to very complex, error-prone implementation. Suppose, for example, a user is editing the main document, clicks on the template and then selects the undo function. Does the user expect the last operation in the main document to be undone or the last operation in the template to be undone? As another example, assume now that a unique identifier for a component of the template has been generated. Subsequently the user enters template editing mode. A sub-document is created. Which component does the unique identifier refer to: the one in the main document or the one in the sub-document?

Another drawback of existing implementations of template editing is that template editing does not support editing of intrinsic server controls within the template sections. There is typically no support in the designer for nested-level template editing. Finally, to exit the template editing mode, typically, a user must right-click on the template and select "End Template Editing" from the context menu. Frequently, a user instead "X"es out of the main document, (i.e., the user closes the menu of the main document window), instead of ending template editing mode. Hence there is no intuitive user interface for exiting the template editing mode and reverting back to the read only preview mode.

In-Place (In-Context) Editing

In accordance with one embodiment of the present invention, the same instance of the hosting file is used to provide the necessary editing capabilities for controls, so that no sub-document is created or used. Hence all features available in the main (hosting) file are available when editing the component. A component, as used herein, can be a file, a document, a control, a user control, a custom control, a server control or the like. Preferably the editing surface, upon selection, is enlarged to fill the entire screen surface, enabling cross-file operations such as undo/redo to be clearer and more deterministic. An "on the face" interface is provided through a command link and close button to terminate the session in a more intuitive way.

Upon opening an editing frame, in one embodiment, the existing contents of the main document are hidden by wrapping the contents in a non-persistable element (holding element). Preferably a standard user interface is generated for the layout of the read/write sections, (e.g., by calling InPlaceEditingFrame.CreateFrameContent in one embodiment). Alternatively, a customized user interface may be generated by the specific editing frame implementation used (e.g., overriding InPlaceEditingFrame.CreateFrameContent in one embodiment).

The appropriate read-write section is loaded from either the corresponding control template (for template editing) or from the "ascx" document (for user control editing) by overriding the call to a module that opens the frame (e.g., InPlaceEditingFrame.OnFrameOpen in one embodiment).

Upon closing the frame, which terminates the in-place editing session, the current contents of the read/write sections are mapped to a corresponding control's template (for template editing) or to the contents of the .ascx/UserControl document (e.g., by customizing the module that saves the frame, InPlaceEditingFrame.OnFrameSave, in one embodiment.)

The in-place editing session typically starts with creating an instance of the specific editing frame and calling a module that opens the frame (e.g., IInPlaceEditingFrame.Open in one embodiment) and terminates through a call to the same module that closes the frame (e.g., IInPlaceEditingFrame.Close in one embodiment), when either clicking the close button or command link or closing the hosting document. In addition, the active in-place editing frame is saved (e.g., by calling IInPlaceEditingFrame.Save in one embodiment) when the main document is saved and when the editing frame is closed explicitly.

Figure 2:
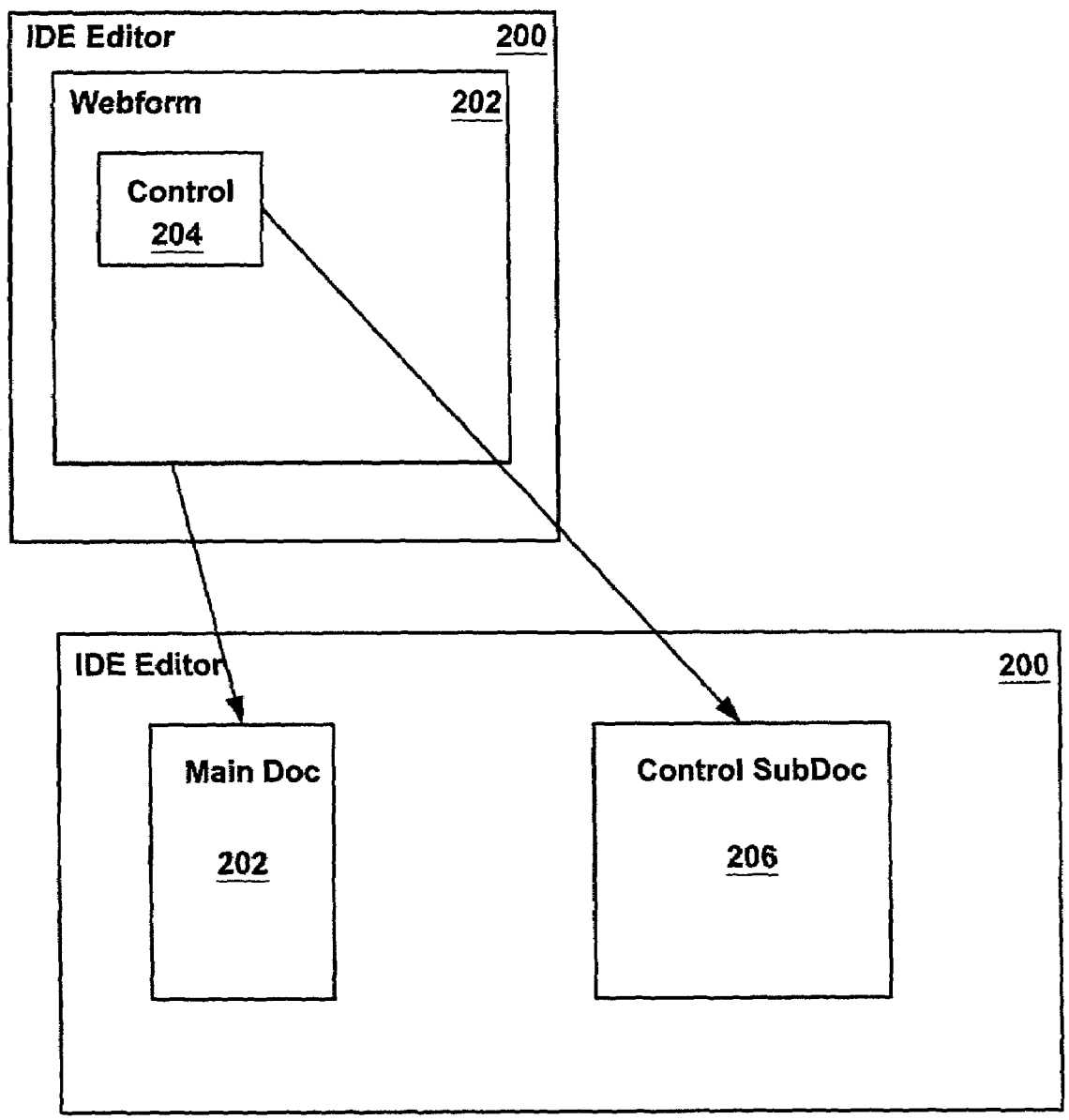
FIG. 2 is a block diagram of an in-place activation system.

FIG. 2 is a system for editing a component within a hosting file, as is known. An editor 200 enables the editing of a hosting file 202, the hosting file 202 including within it a component 204. When the component 204 is selected for editing, a sub-file 206 is generated for component 204 so that editor 200 now contains an instance of hosting file 202 and a separate instance of component 206.

Figure 2A:
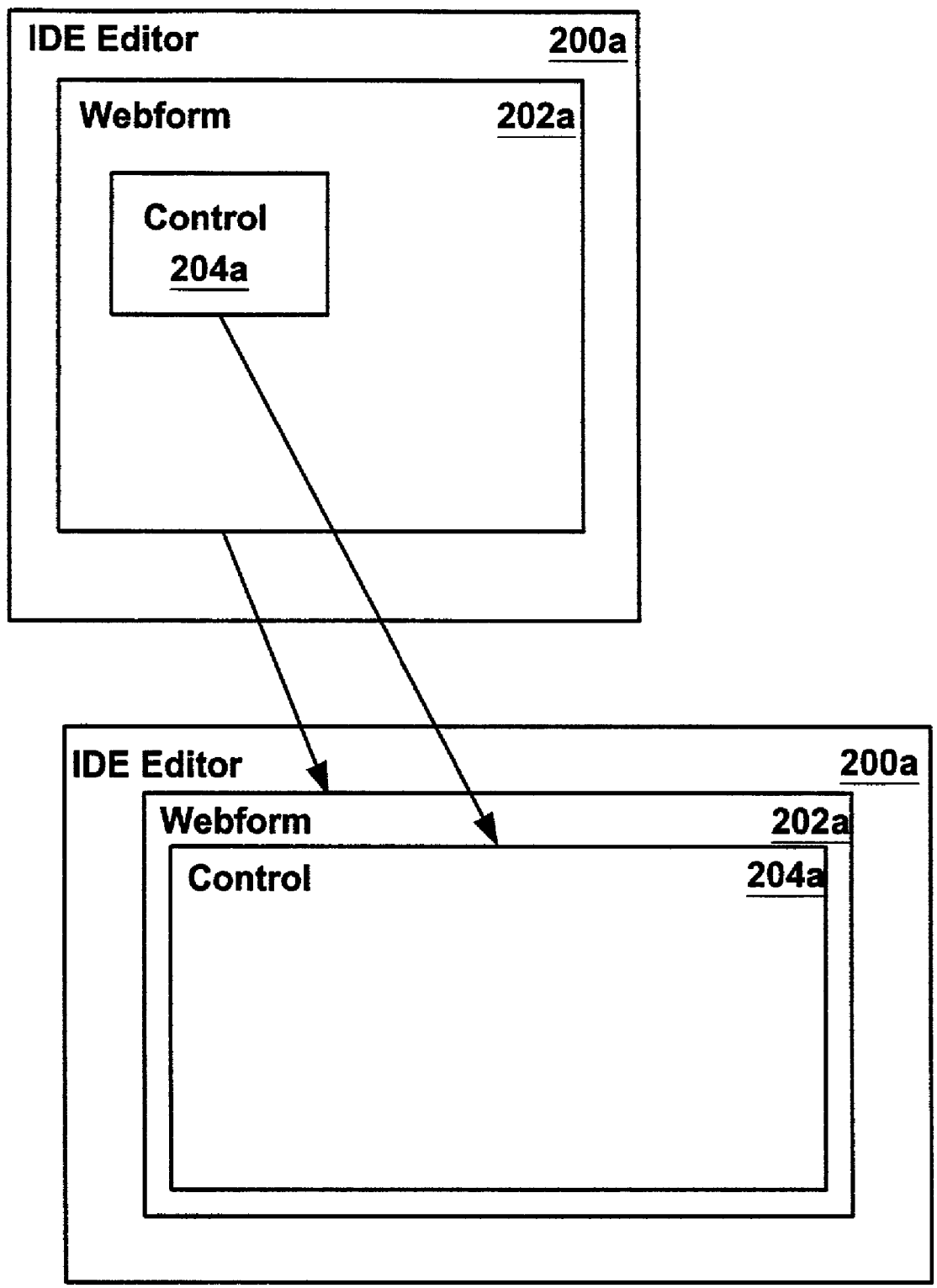
FIG. 2a is a block diagram of an in-context editing system in accordance with one embodiment of the present invention.

FIG. 2a is a system for editing a component from within the context of the hosting file, in accordance with one embodiment of the invention. Editor 200a enables the editing of a hosting file 202a, the hosting file 202a including within it a component 204a. When the component 204a is selected for editing from within the hosting file 202a, an editing frame for component 204a is expanded to fill the entire editing surface. Thus component 204a is edited within the context of hosting file 202a. Hosting file 202a may contain multiple components (of which component 204a is one.) Similarly, a component (e.g., component 204a) may contain one or more components within it.

Figure 3:
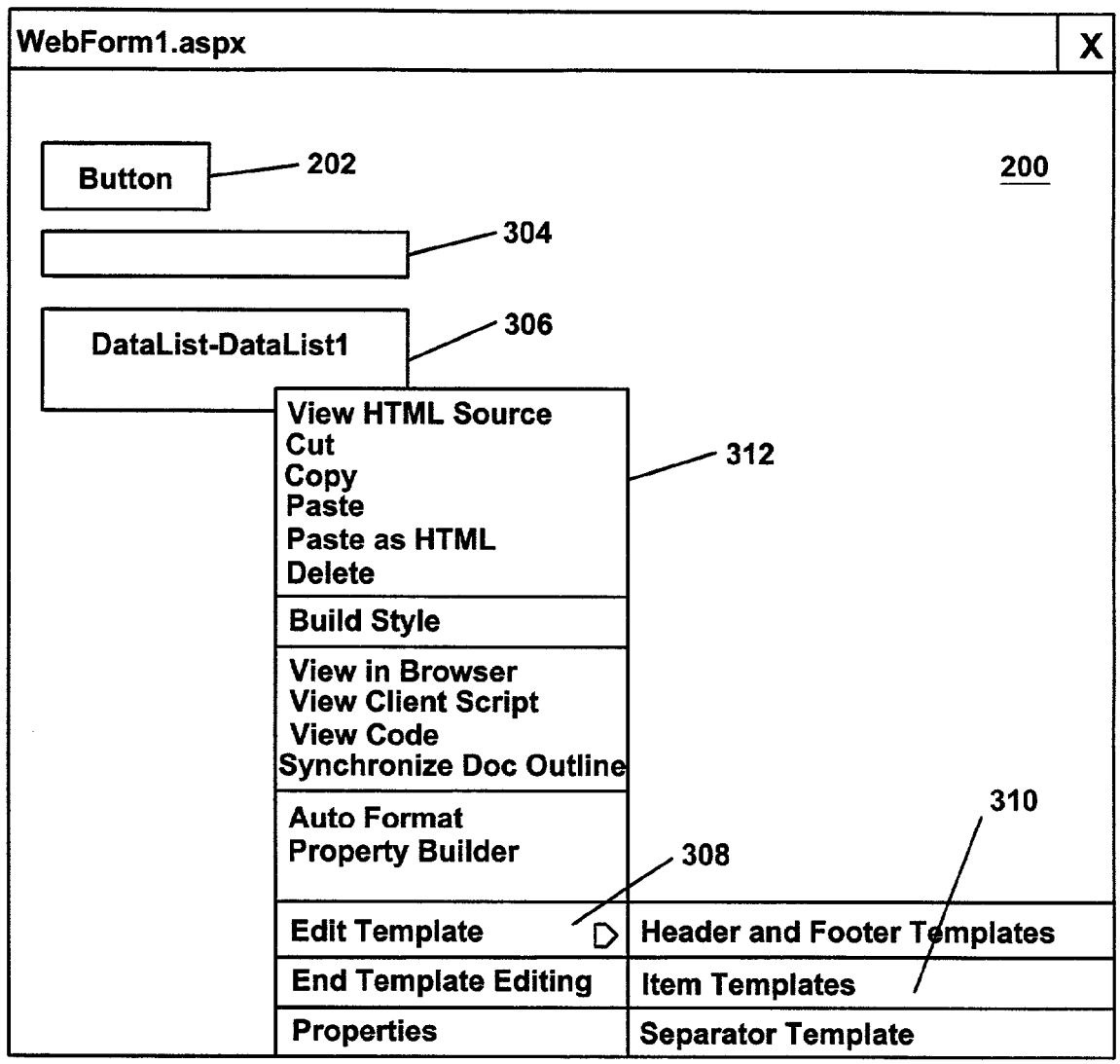
FIG. 3 illustrates an exemplary WebForm containing several controls.

FIGS. 3, 3a, 4, 4a, 5, 5a, 6 and 6a show the process of template editing as now known (FIGS. 3, 4, 5 and 6) and template editing in accordance with one embodiment of the invention (FIGS. 3a, 4a, 5a and 6a). FIG. 3 is an illustration of a WebForm file 202 (e.g., WebForm1.aspx) including three controls: a Button control 204, a TextBox control 304 and a DataList control 306. Button control 204, TextBox control 304 and DataList control 306 are read-only controls and therefore the contents of these controls are not editable when in Design view.

DataList control 306 might contain a header (a description, perhaps, of what the datalist contains, such as "Employee Listing for June 2002"), items (a description of the contents of each item in the datalist, such as for example, employee name, employee address, employee social security number, and a letter indicating employee status), and a footer (perhaps a legend indicating what the employee status letters indicate, such as S means salaried and H means hourly).

Exemplary DataList control 306 is typically associated with a template that describes what the header, items and footer look like. To edit DataList control 306, template-editing mode may be entered. Template-editing mode is a semi read-write mode in which certain complex properties of the control, such as but not limited to HeaderTemplate, ItemTemplate and FooterTemplate may be modified. By right-clicking on DataList control 306, option box 312 is displayed. Assume that DataList Item is being modified. By selecting Edit Template option 308, and Item Templates 310 from the context menu, template editing mode for DataList Item is entered.

Figure 3A:
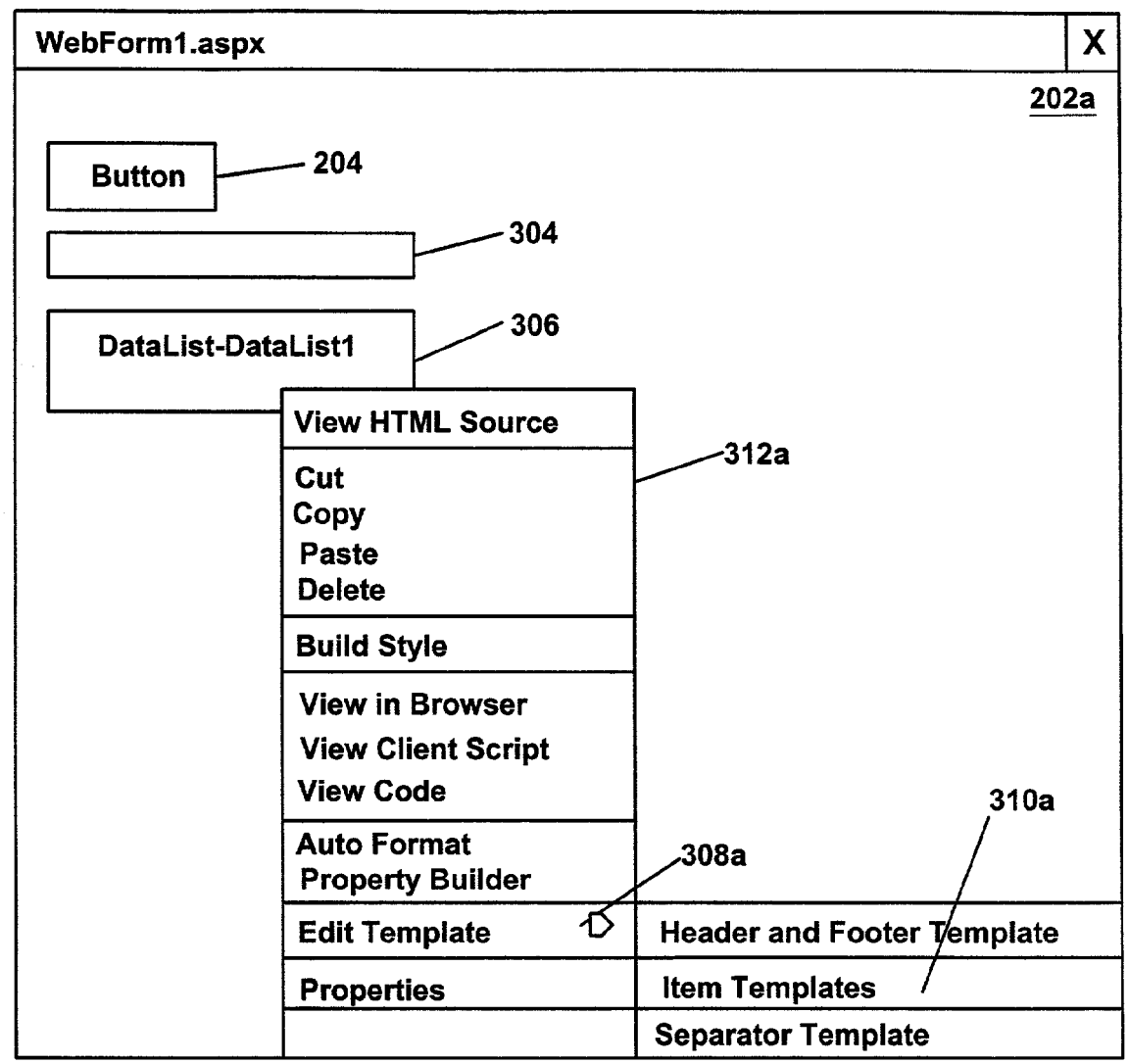
FIG. 3a illustrates an exemplary WebForm containing several controls in accordance with one embodiment of the invention.

FIG. 3a is an illustration of a WebForm file 202a in accordance with one embodiment of the invention. WebForm file 202a (e.g., WebFor1.aspx) includes three controls: a Button control 204, a TextBox control 304 and a DataList control 306. DataList control 306 is similarly associated with one or more templates. By right-clicking on DataList control 306, option box 312a is displayed. It can be seen that the "End Template Editing" option is no longer available. By selecting Edit Template option 308a and Item Templates 310a, template editing mode for DataList Item is entered.

Figure 4:
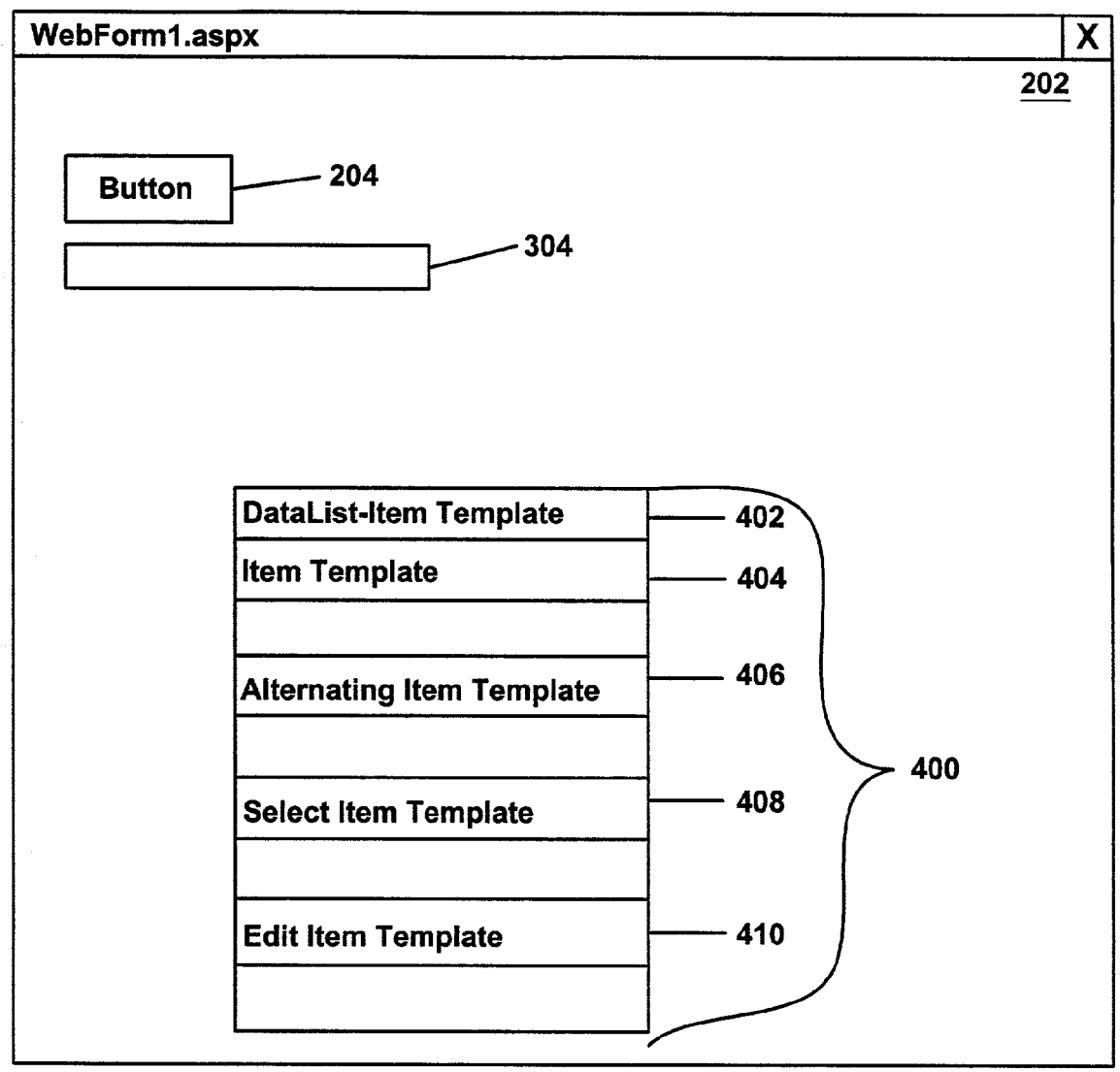
FIG. 4 illustrates an exemplary WebForm control sub-document, in which template editing mode has been entered.

FIG. 4 is an illustration of the WebForm file 202 after the command to edit the item template 310 (FIG. 3) is executed. As can be seen, DataList control 306 is transformed from its default read-only mode to a semi read-write mode (template editing mode). In the case demonstrated, there are four templates that could be edited in DataList Template 402, ItemTemplate 404, AlternatingItemTemplate 406, SelectedItemTemplate 408 and EditItemTemplate 410.

Typically, entering template editing mode triggers the generation of a completely separate instance of a sub-file 400. Sub-file 400 may have different characteristics than that of the hosting file 202 (i.e., main/master file). Modifications can be made both within the template and outside of it at the same time, thereby making operations like undo/redo etc. confusing and non-deterministic.

Figure 4A:
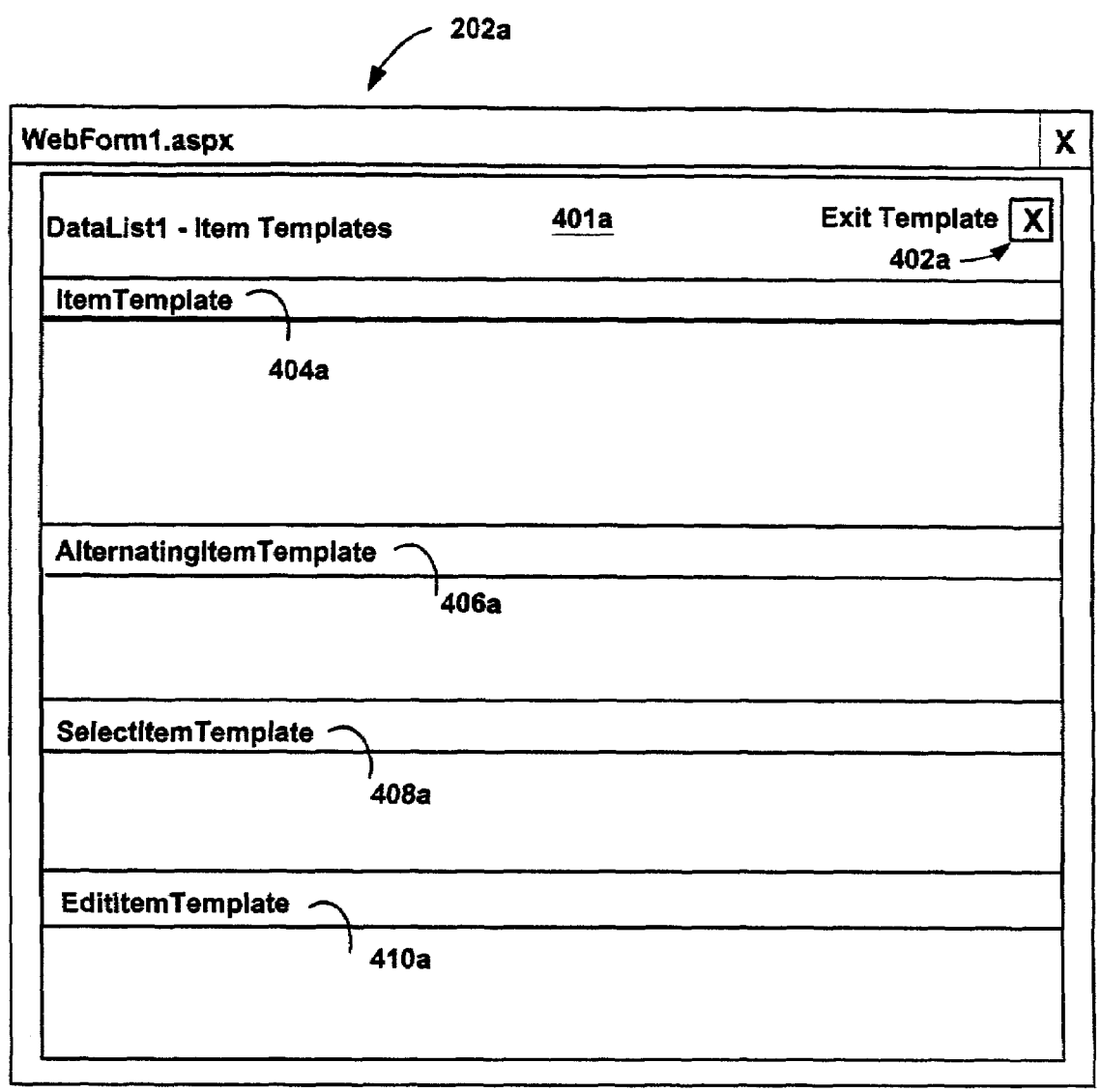
FIG. 4a illustrates the exemplary WebForm of FIG. 3a, in which template editing mode has been entered, in accordance with one embodiment of the present invention.

FIG. 4a is an illustration of the WebForm file 202a after the command to edit the item template (FIG. 3a) is executed. As can be seen, DataList control 306 is transformed from its default read-only mode to a semi read-write mode (template editing mode). The template 401a substantially fills the entire editing surface. In the case demonstrated, the four sections of the template that can be edited, ItemTemplate 404a, AlternatingItemTemplate 406a, SelectedItemTemplate 408a and EditItemTemplate 410a represent the sections of the ItemTemplate 401a that can be edited. It should be noted that the template editing area is not a separate sub document instance but is the same instance of hosting file 202a and thus there are no differences in the characteristics of the hosting file 202a and the component 204a. Once template-editing mode has been entered, changes outside the template are no longer possible until template-editing mode has been closed, thus making the template-editing process more intuitively understandable.

Figure 5:
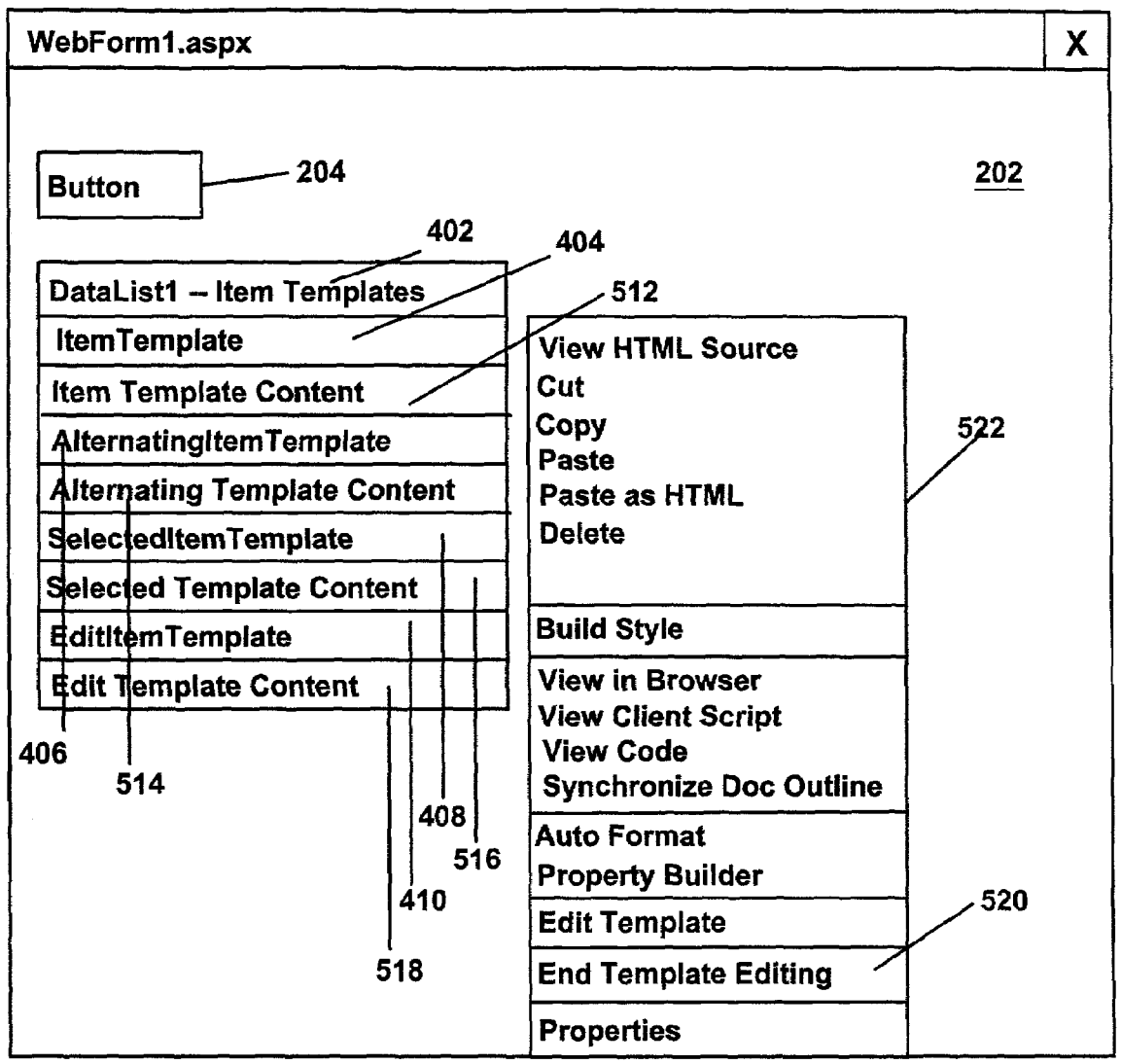
FIG. 5 illustrates the exemplary WebForm control sub-document of FIG. 4, in which a portion of a control has been modified.

FIG. 5 is an illustration of WebForm file 202 after some changes have been made to ItemTemplate content area 512, AlternatingTemplate content area 514, SelectedTemplate content area 516 and EditTemplate content area 518. Right-clicking now causes the appearance of option box 522, which now contains the option End Template Editing 520.

Figure 5A:
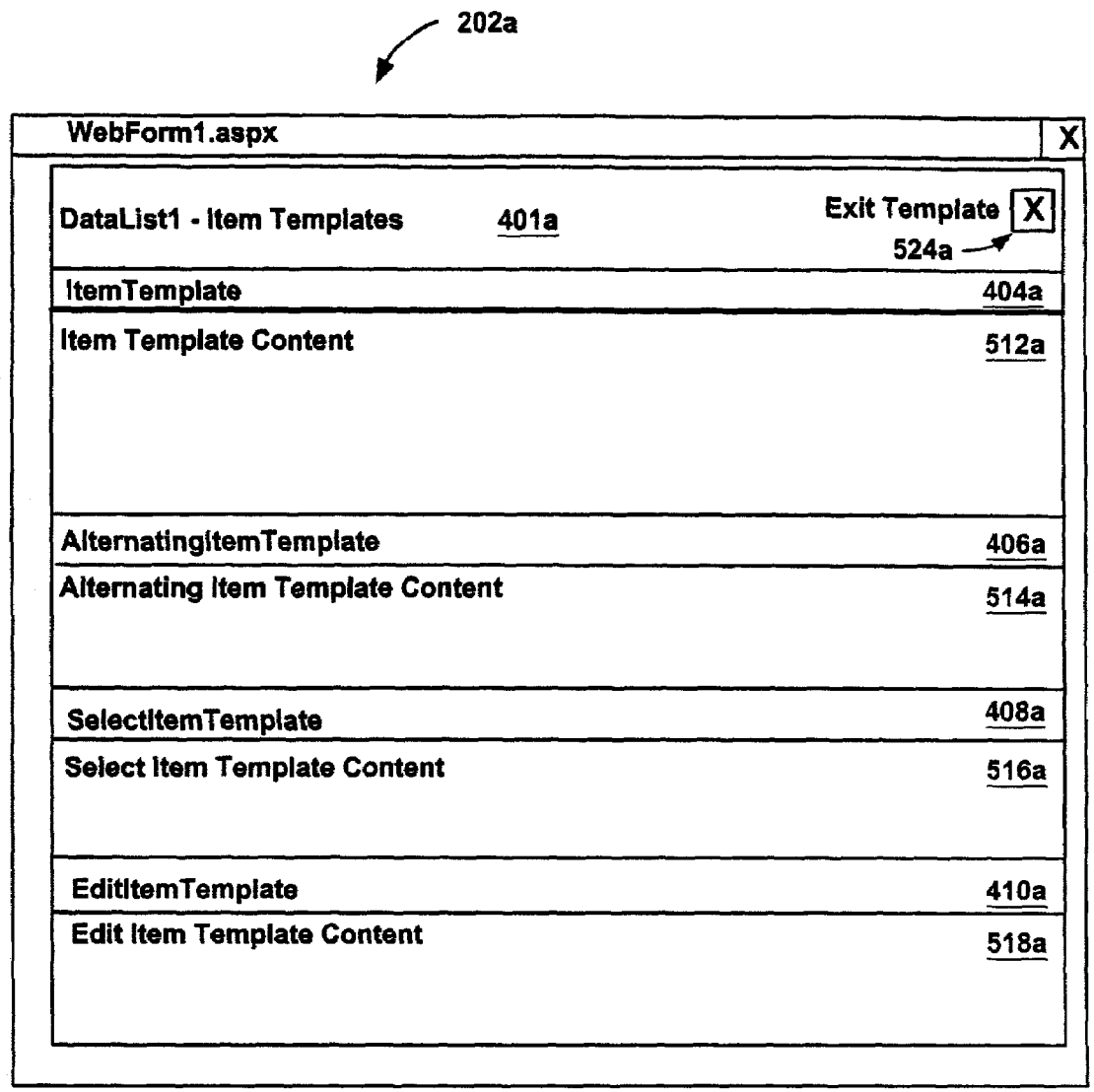
FIG. 5a illustrates the exemplary WebForm of FIG. 4a, in which a portion of a control has been modified in accordance with one embodiment of the present invention.

FIG. 5a is an illustration of WebForm file 202a after analogous changes have been made to ItemTemplate content area 512a, AlternatingTemplate content area 514a, SelectedTemplate content area 516a and EditTemplate content area 518a. It can be seen that it is not possible to edit outside of the template until template-editing mode is ended. Right-clicking is no longer needed to terminate template editing. To terminate template editing, the Exit Template "X" 524a is clicked.

Figure 6:
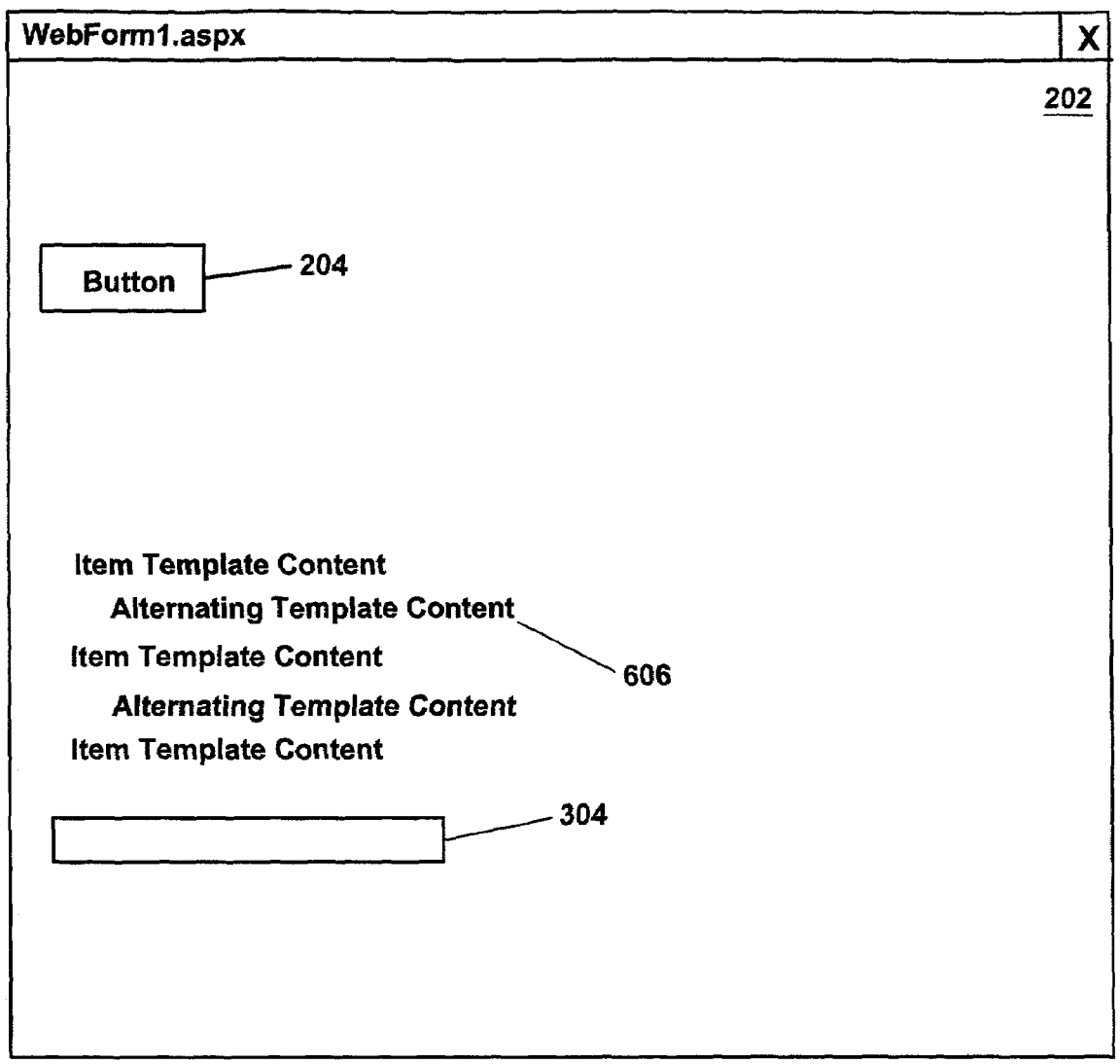
FIG. 6 illustrates the exemplary WebForm of FIG. 3, in which template editing mode has been exited.
Figure 6A:
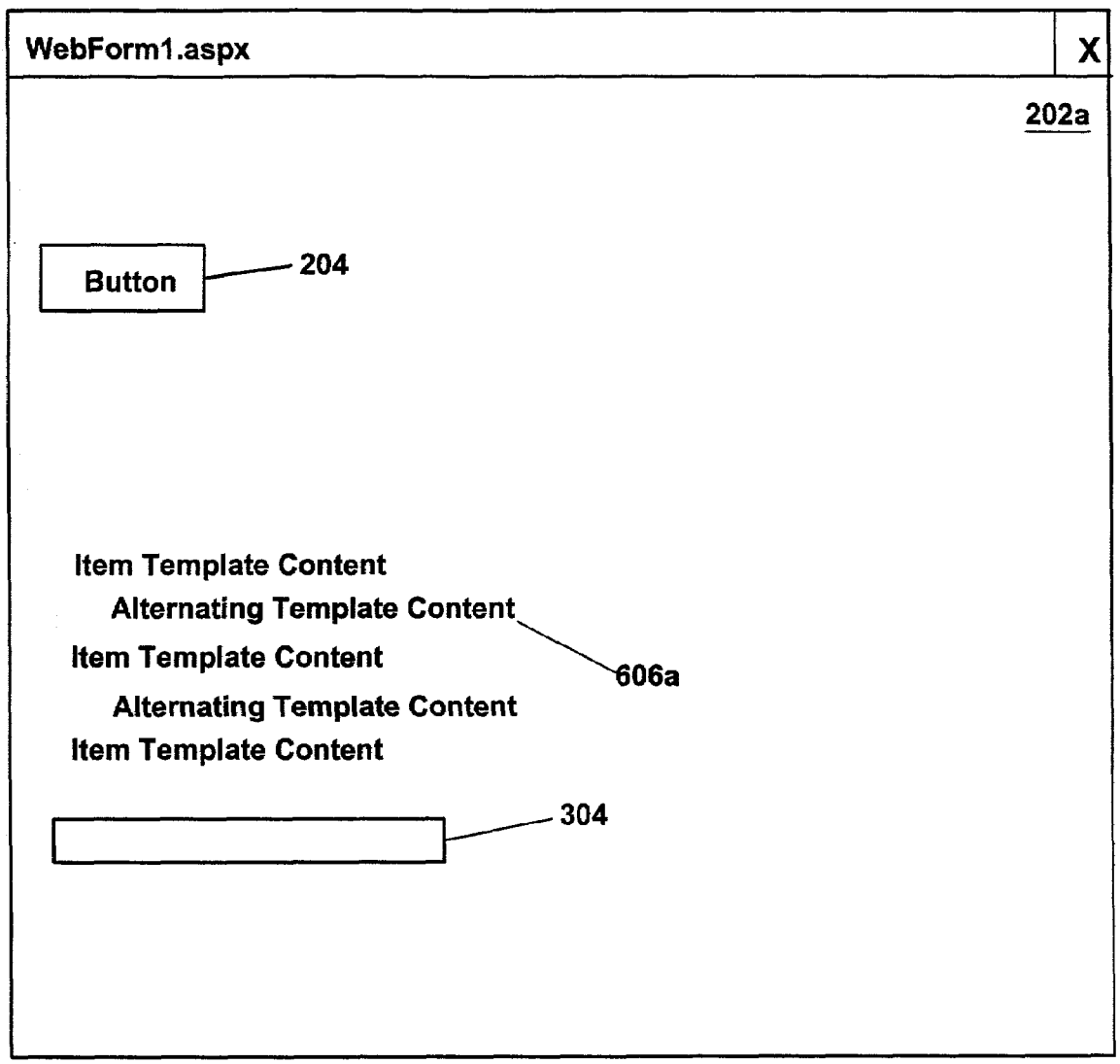
FIG. 6a illustrates the exemplary WebForm of FIG. 5a, in which template editing mode has been exited in accordance with one embodiment of the present invention.

FIG. 6 is an illustration of WebForm file 202 after the changes have been made and template editing has been exited. It can be seen that DataList control 606 now contains updated content. FIG. 6a is an illustration of WebForm file 202a after the changes have been made and template editing has been exited. It can be seen that DataList control 606a now contains updated content.

FIGS. 7, 7a, 8, 8a, 9, 9a, 10 and 10a show the process of user control editing. FIGS. 7, 8, 9 and 10 show the process of user control editing as is now known and FIGS. 7a, 8a, 9a and 10a show the process of user control editing in accordance with one embodiment of the invention.

Figure 7:
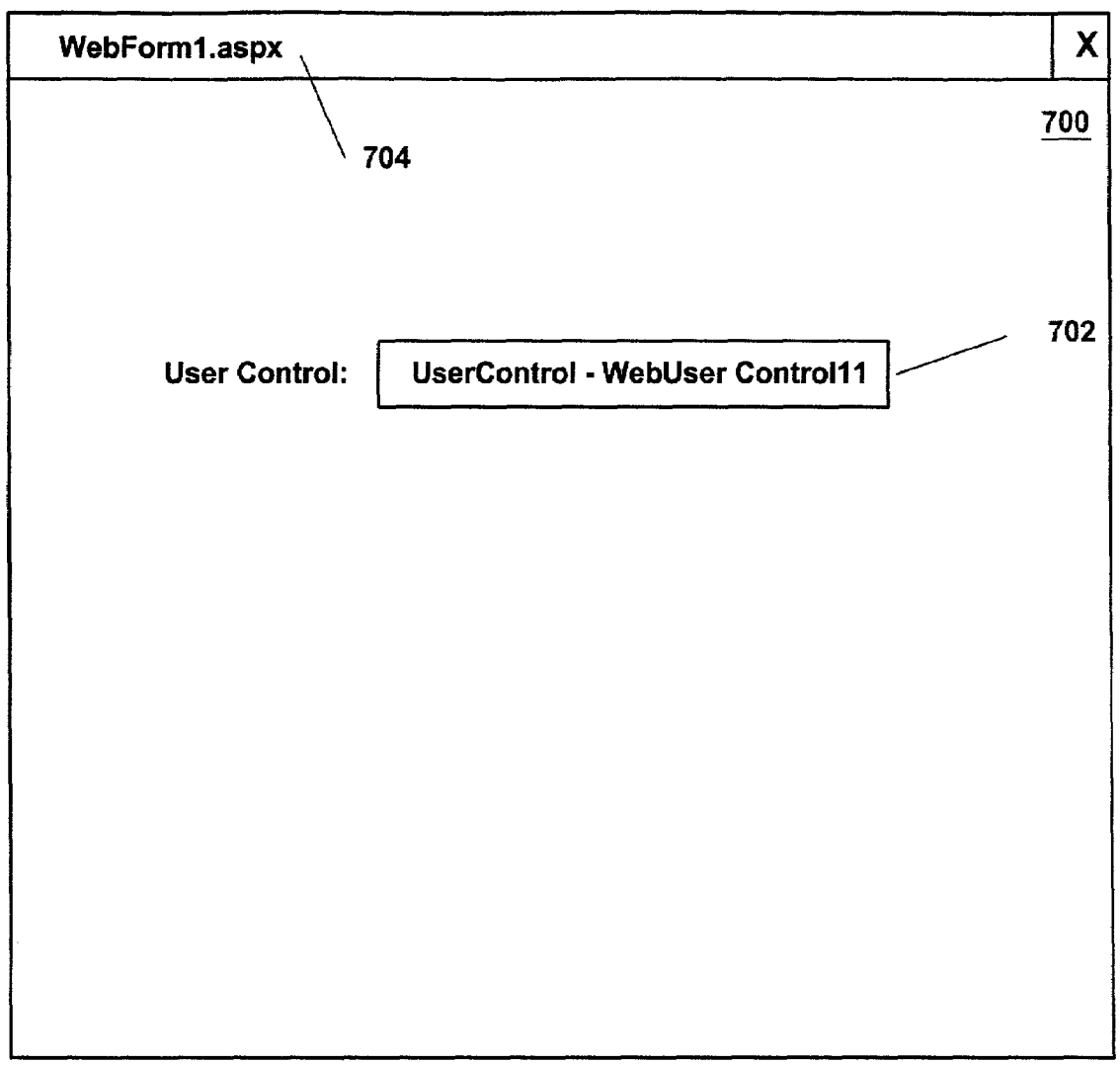
FIG. 7 illustrates an exemplary WebForm containing an exemplary user control.

FIG. 7 is an illustration of a WebForm file 700 (e.g., WebForm1.aspx*) including a user control 702. User control 702 is a document file having a file extension of .ascx. It can be seen that user control 702 is visible within the main or master document 700 but the contents of user control 702 are not visible. User control 702 cannot be edited within the bounds of WebForm 700 (e.g., see tab WebForm.aspx* 704). A user control file (e.g., WebForm1.ascx) must be opened separately, as will be shown in FIG. 8.

Figure 7A:
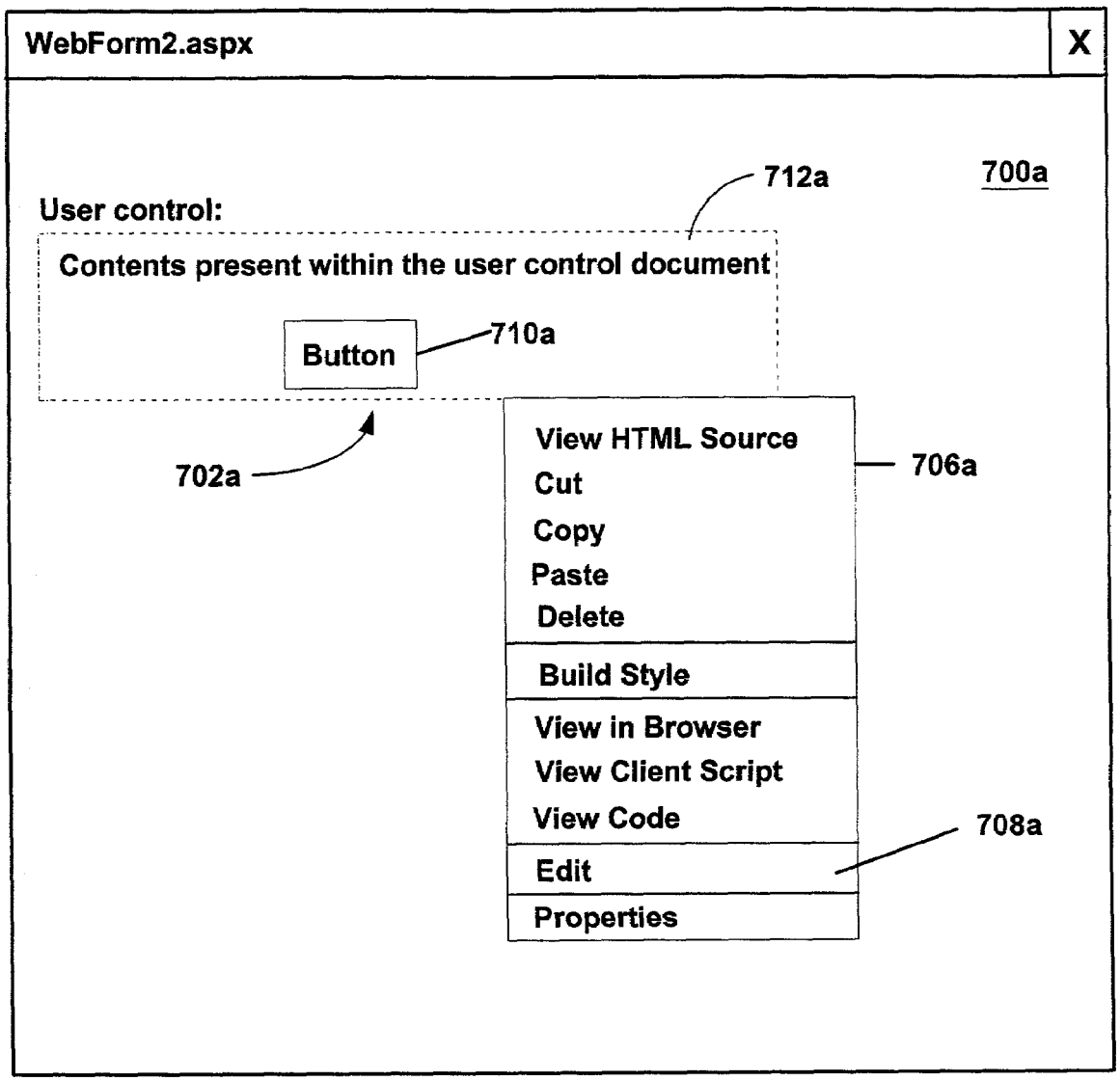
FIG. 7a illustrates an exemplary WebForm containing an exemplary user control in accordance with one embodiment of the present invention.

FIG. 7a is an illustration of a WebForm file 700a (e.g., WebForm2.aspx*) according to one embodiment of the invention. File 700a includes a user control 702a. It can be seen that the contents present within the user control file, Button 710a and text 712a (i.e., "Contents present within the user control document") are visible. By right-clicking on user control 702a, option box 706a is caused to appear. One of the options available in option box 706a is Edit 708a. Selection of edit 708a, enables editing of the user control 702a, as will be shown in FIG. 8a.

Figure 8:
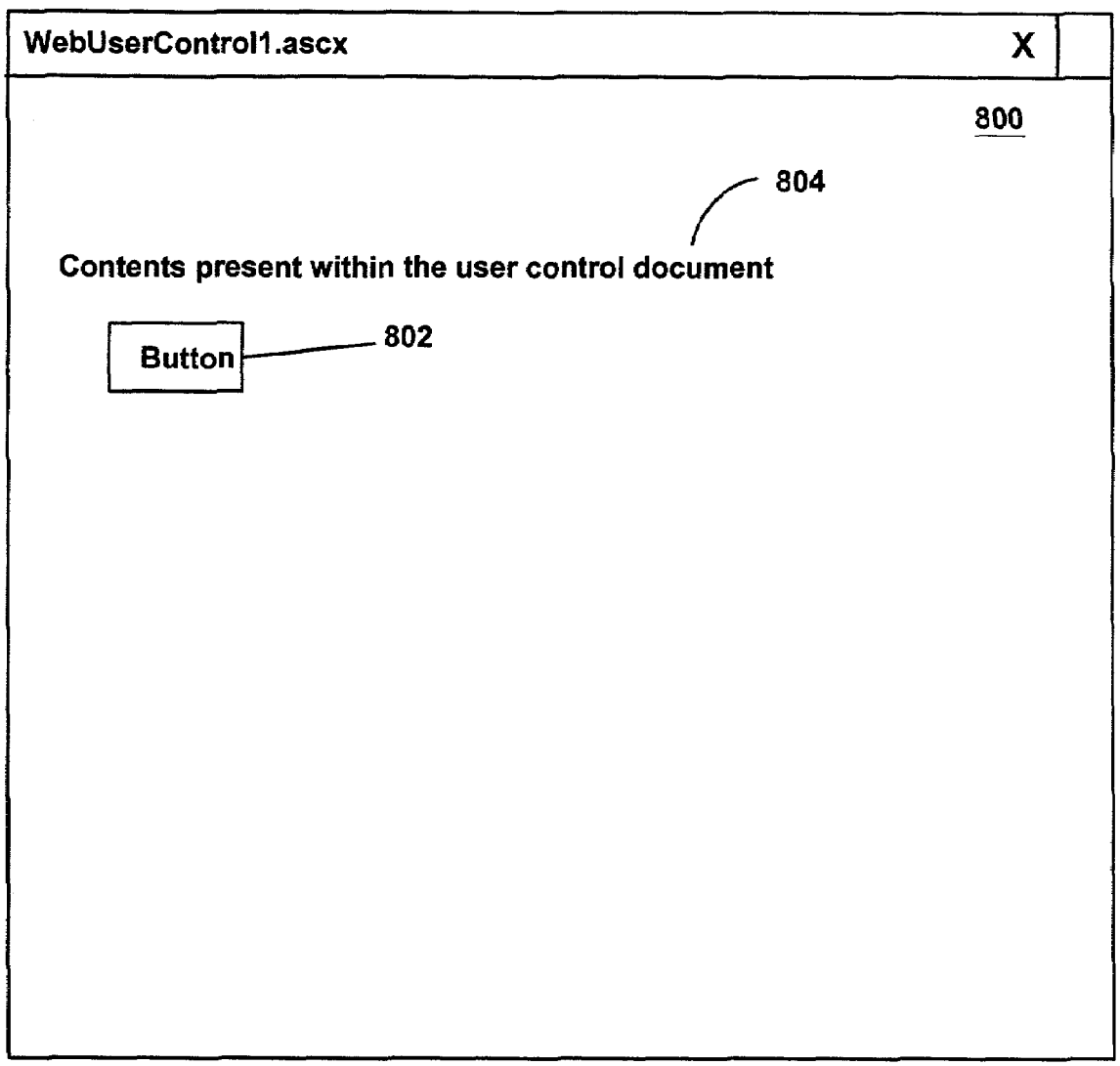
FIG. 8 illustrates an exemplary WebForm user control sub-document, in which user control editing mode has been entered.
Figure 8A:
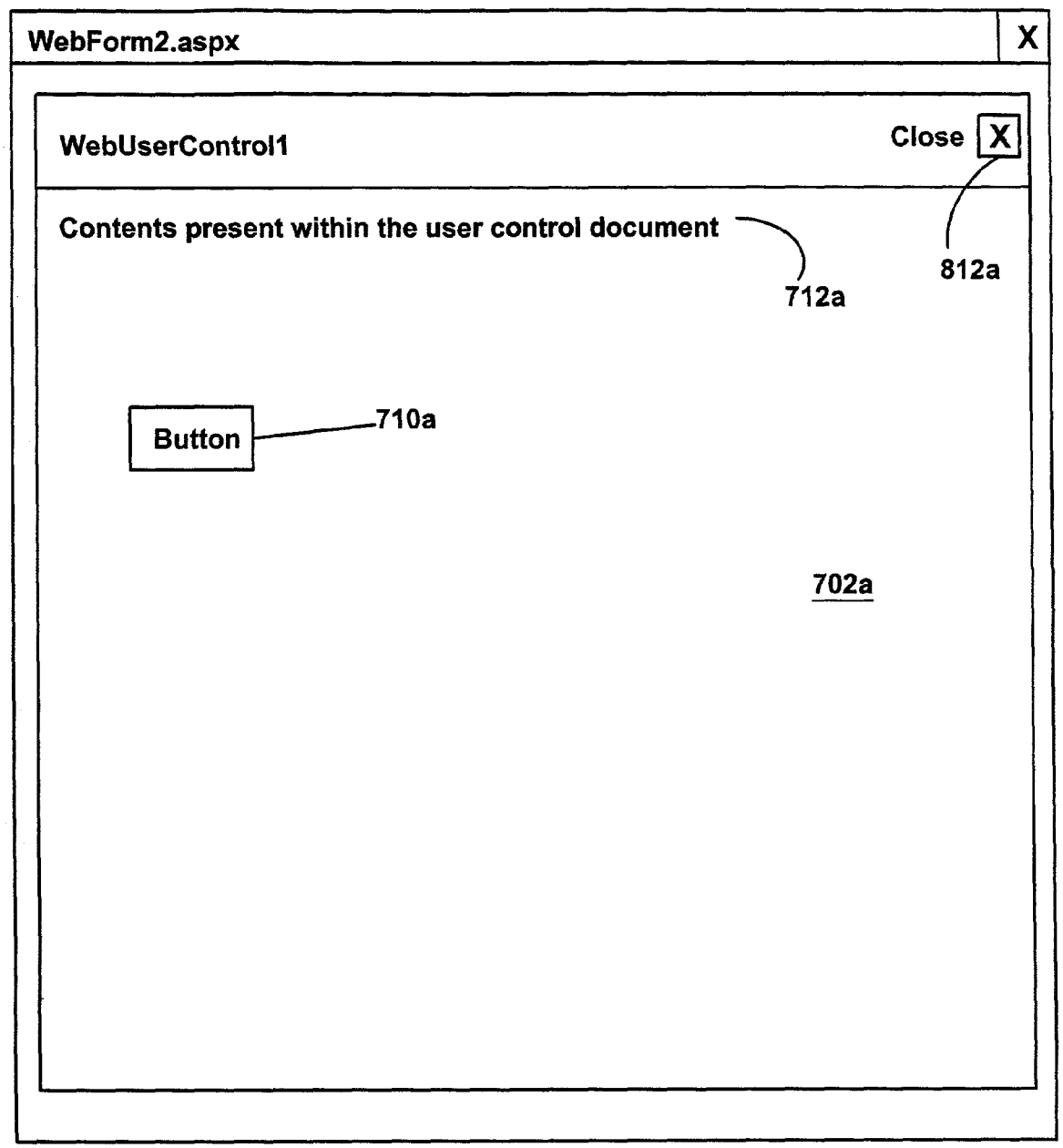
FIG. 8a illustrates the exemplary WebForm of FIG. 7a, in which user control editing mode has been entered in accordance with one embodiment of the present invention.

FIG. 8 is an illustration of sub-file 800 (e.g., WebUserControl1.ascx), in which the current contents of the user control 702 is loaded and ready for modification, if desired. In WebUserControl1.ascx sub-file 800, the contents of user control 702 is some text 804 and a Button control, 802. FIG. 8a is an illustration of the user control section 702a of WebForm file 700a, (it should be noted that the same hosting file 700a is being edited) in which the user control 702a occupies substantially the entire editing surface of the display. Text 712a and Button control 710a are still visible and ready for modification, if desired. Exiting from user control editing can be accomplished by clicking on termination box 812a.

Figure 9:
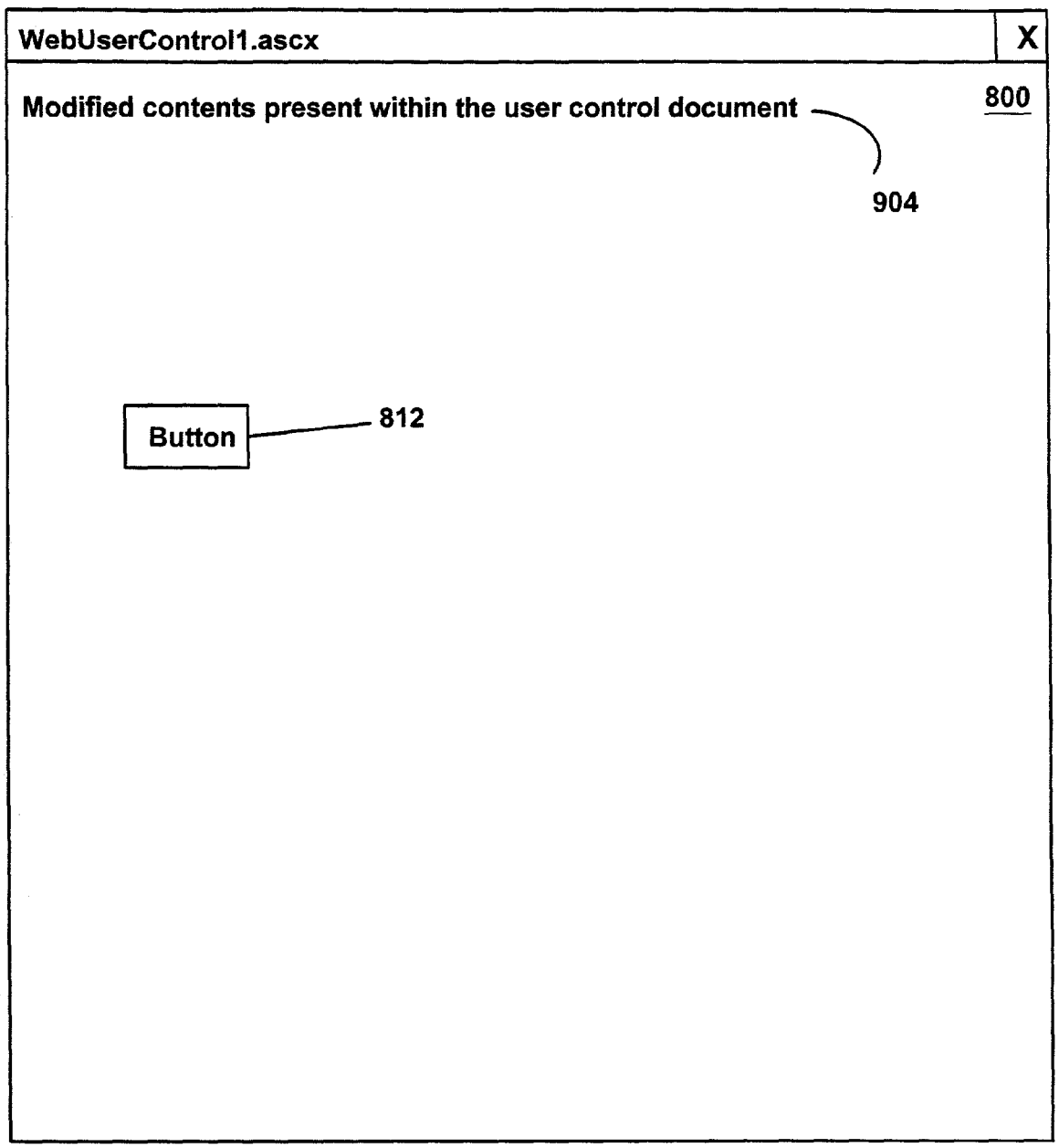
FIG. 9 illustrates the exemplary WebForm user control sub-document of FIG. 8, in which modifications have been made to the exemplary user control of FIG. 7.
Figure 9A:
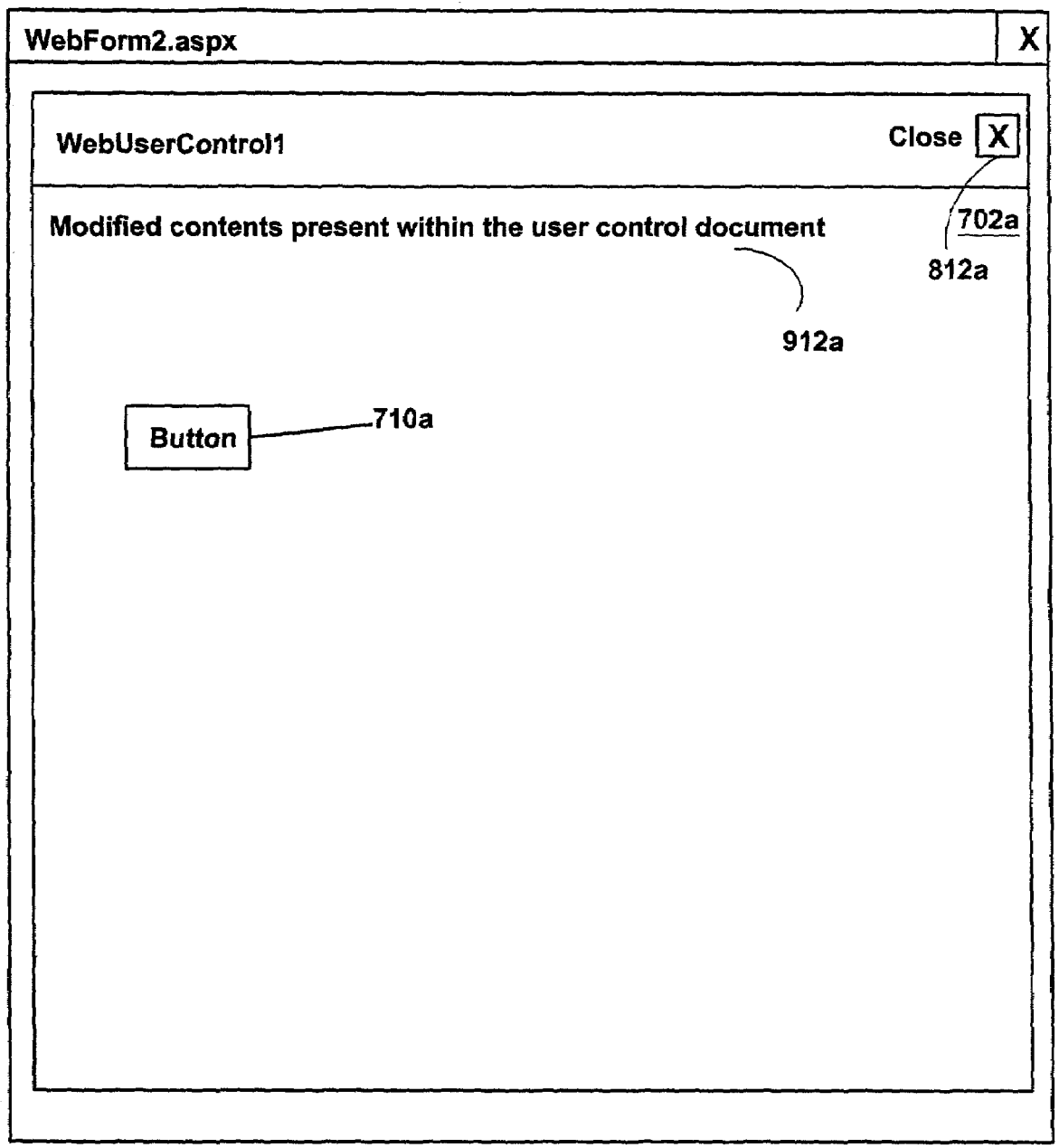
FIG. 9a illustrates the exemplary WebForm of FIG. 8a, in which modifications have been made to the exemplary user control of FIG. 7a, in accordance with one embodiment of the present invention.

FIG. 9 is an illustration of sub-file 800 (e.g., WebUserControl1.ascx), in which the contents of the user control 702 has been modified. Specifically, text "Contents present within the user control document" 804 has been changed to "Modified contents present within the user control document" 904. Button control 802 is unchanged. User control editing mode is exited by right clicking on the control and selecting End Editing as described above with respect to template-editing. FIG. 9a is an illustration of the user control section 702a of WebForm file 700a. The user control 702a occupies substantially the entire editing surface of the display. Text 912a has been modified to read: "Modified contents present within the user control document". Button 710a is unchanged. User control editing mode is ended by clicking on the close box 812a.

Figure 10:
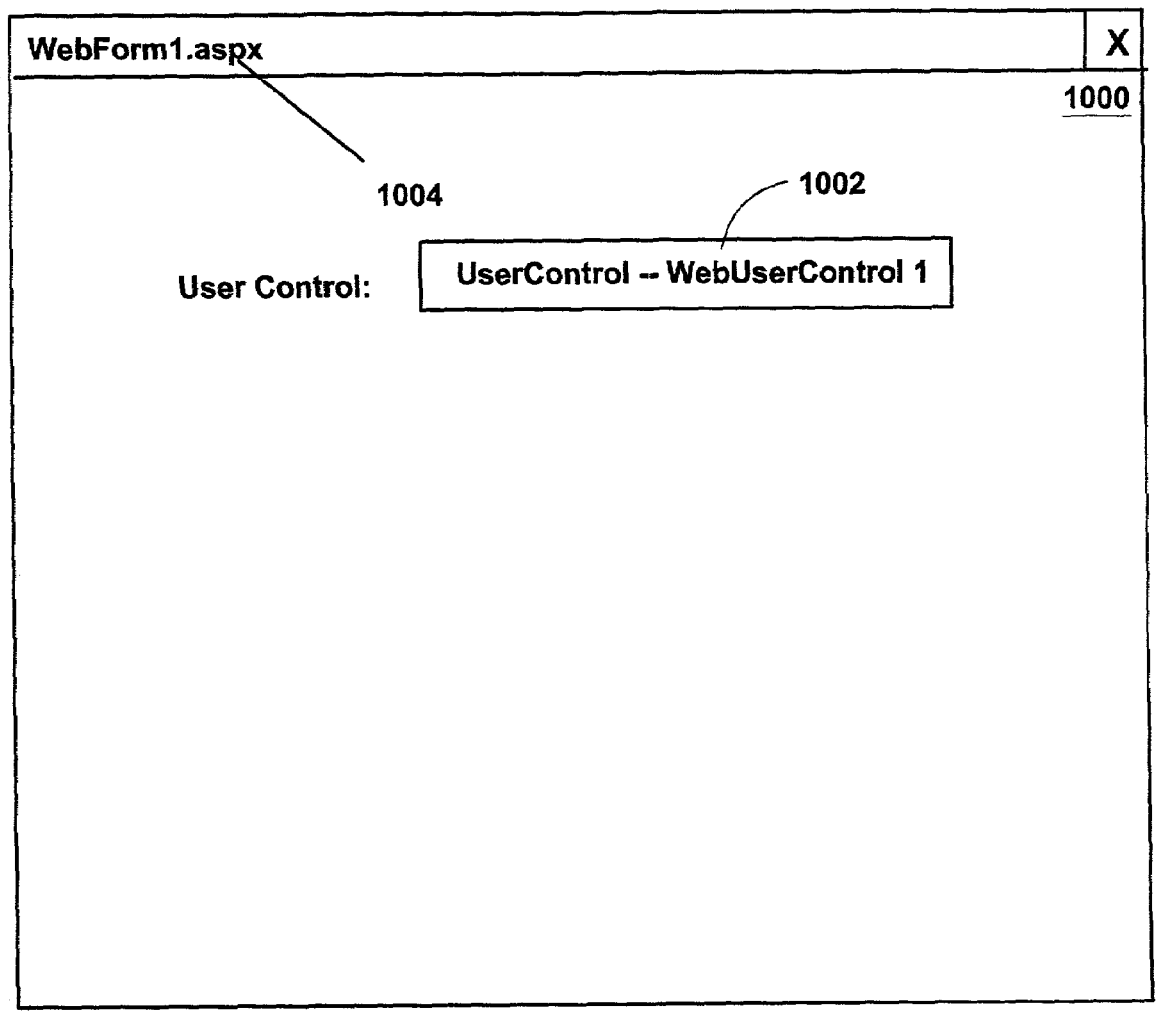
FIG. 10 illustrates the exemplary WebForm of FIG. 7, in which user control editing mode has been exited.
Figure 10A:
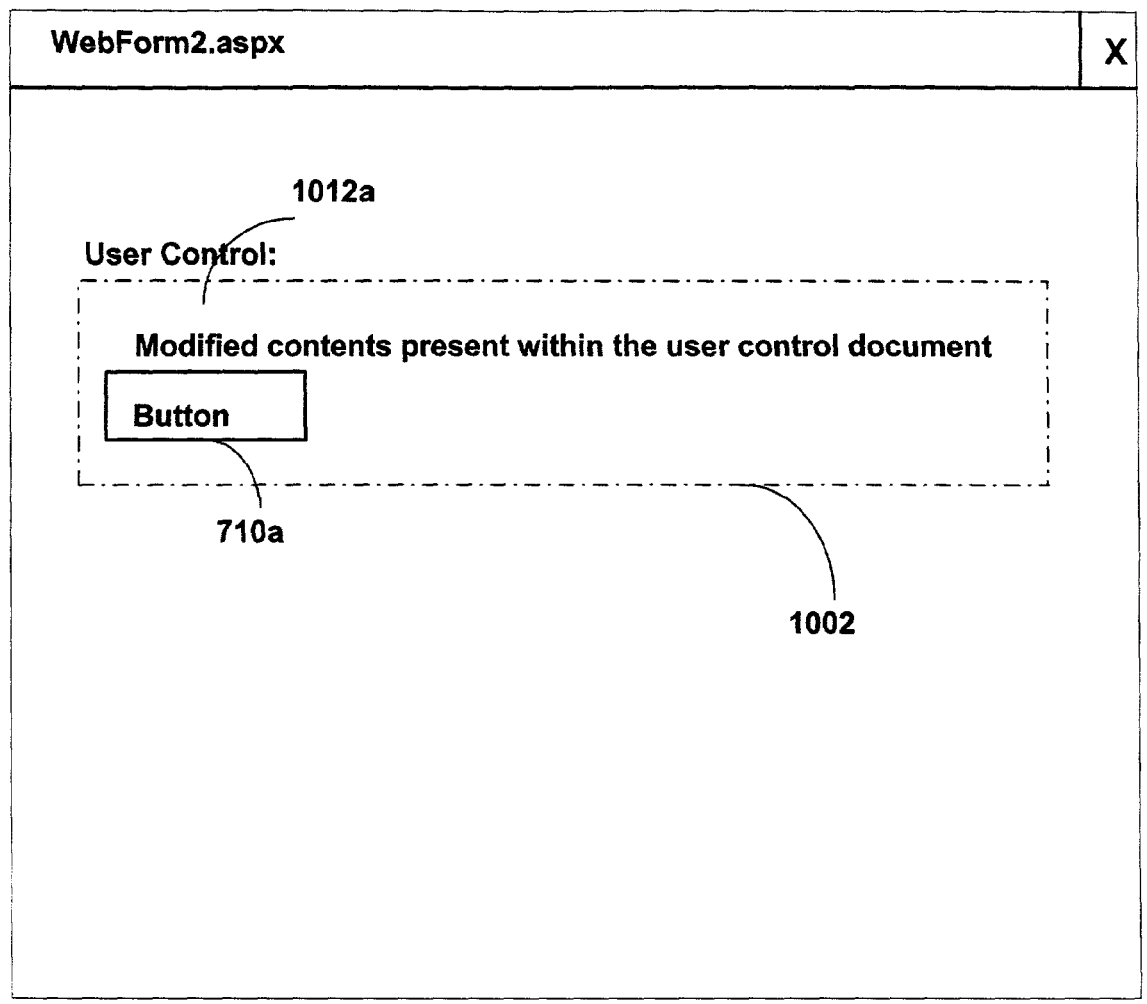
FIG. 10a illustrates the exemplary WebForm of FIG. 9a, in which user control editing mode has been exited in accordance with one embodiment of the present invention.

FIG. 10 is an illustration of WebForm file 1000 (e.g., modified WebForm1.aspx* of FIG. 7) including a user control 1002. User control 1002, although it looks identical to user control 702 of FIG. 7, in fact is modified as shown in FIG. 9. FIG. 10a is an illustration of modified WebForm file 700a (e.g., WebForm2.aspx*) according to one embodiment of the invention. File 700a still includes a user control 1002a. It can be seen that the contents present within the user control file are, Button 710a (unchanged) and text 1012a (i.e., "Modified contents present within the user control document"). Hence changes are made to the user control from within the context of the WebForm file.

Figure 11:
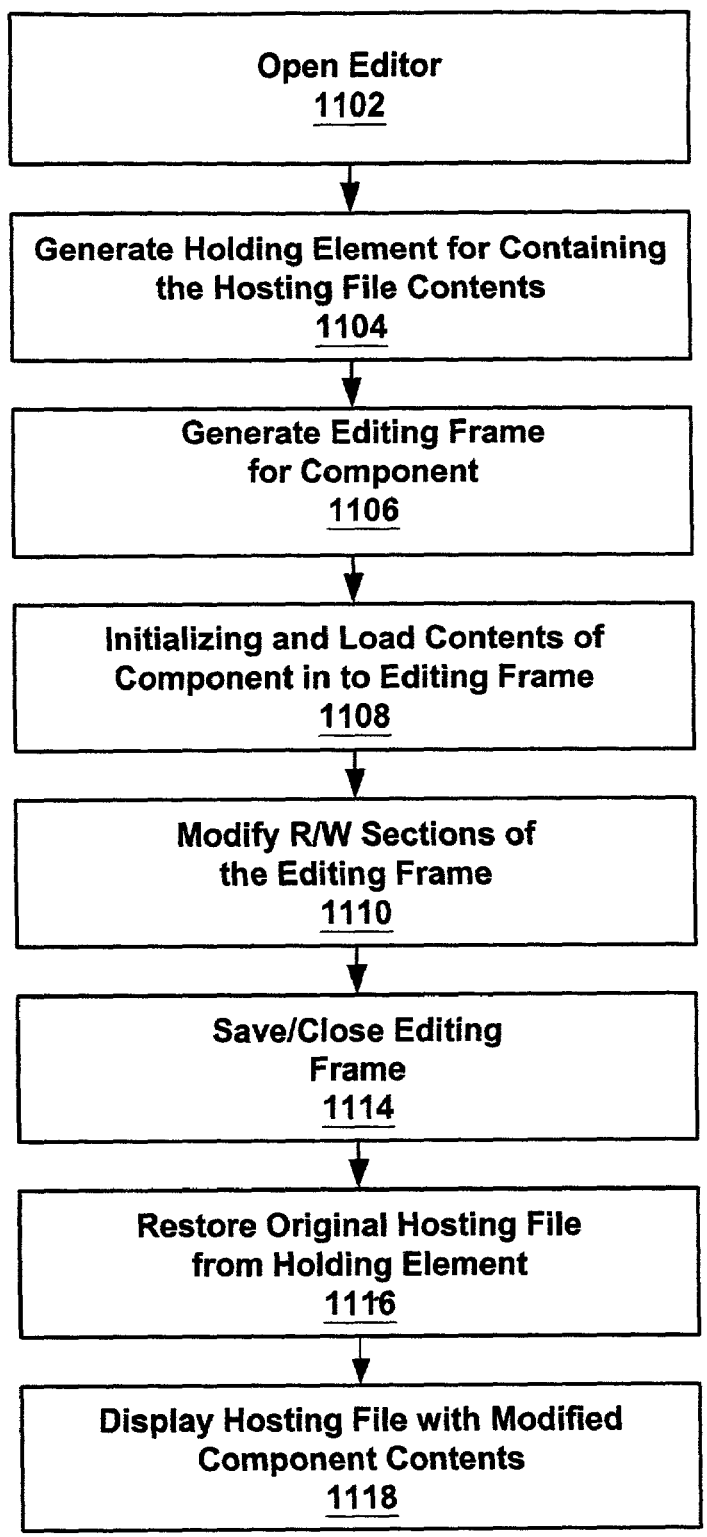
FIG. 11 is a flow diagram of an in-context editing method in accordance with one embodiment of the invention.

FIG. 11 is a flow diagram of a method for editing a component from the context of a hosting file in accordance with one embodiment of the invention. In step 1102 a hosting file such as but not limited to editor 200a is opened and a component is selected to be edited. At step 1104, a non-persistable element is generated to hold and hide the original contents of the hosting file, (e.g., the WebForm1.aspx document in the template editing example and WebForm2.aspx document in the user control editing example). Upon selection of a component to edit, at step 1106 an editing frame is generated to display, for example, the user interface of the component (e.g., the user control). At step 1108, the read-only and read/write sections within the frame are initialized and loaded with corresponding data, (e.g., control properties). At step 1110, the read/write sections are modified, as desired. At step 1114, the current (potentially modified) contents of the read/write sections are saved, (e.g., to the control properties). The editing process of the component is ended by selecting "close" by clicking the close button or by selecting the close option of the file menu. In one embodiment, if the edited frame has not been saved when the user exits, an option to save the modifications is provided. The editing frame can thus be closed with or without saving the modifications. At step 1116, the editing frame of the component is hidden, and the original content of the hosting file is restored. The original component is replaced with the updated component, the updated component being visible in the original hosting file (step 1118). It should be understood that while in the example there is a hosting file containing a single component, the hosting file may include a plurality of components, and that, similarly, the component may include one or more components within it.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. For example, although the invention has been described within the context of the .NET framework, it should be understood that the invention is not limited to implementation therein. For example, the invention encompasses use in word processors or other editors and editing tools. A word processing editor, for example, may enable an embedded spreadsheet file to be edited within the context of a hosting word processing file. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A software-based method for performing an editing operation on a component within an original hosting file, based on input received from a user, the method comprising:

accessing the original hosting file using a hosting file editor having specific editing features for editing the original hosting file, the original hosting file associated with a hosting context, wherein the original hosting file comprises original hosting file content and at least one of a plurality of components, the plurality of components hosted within the original hosting file, the at least one of the plurality of components comprising a re-usable block of programming code associated with a component context and created by a component editor, wherein the original hosting file and the at least one of the plurality of components are separately editable by the hosting file editor and the hosting file editor provides all of the specific editing features available in the original hosting file for editing the at least one of the plurality of components;

accessing the at least one component using the hosting file editor without creating a sub-document for editing the at least one component through an editing area within the context of the original hosting file;

performing the editing operation on the at least one component using the hosting file editor within the context of the original hosting file, the editing operation generating an update to the at least one component, wherein the original hosting file is wrapped in a non-persistable holding element and hidden during the editing operation of the at least one component; and closing the hosting file editor and restoring the original hosting file content from the non-persistable holding element, wherein the update to the at least one component replaces the at least one component in the original hosting file, the update to the at least one component being visible in the original hosting file.

2. The method of claim 1, wherein the at least one component is one of a file, a document, a control, a user control, a custom control and a server control.

3. The method of claim 1, further comprising creating a second holding element to hold the at least one component.

4. The method of claim 3, wherein the second holding element is an editing frame.

5. The method of claim 4, wherein the editing frame enables a modifiable section of the at least one component to be edited.

6. The method of claim 4, further comprising initializing the editing frame.

7. The method of claim 4, further comprising loading a read/write section of the editing frame with data associated with the at least one component.

8. The method of claim 4, wherein the editing frame substantially fills an editing display surface.

9. The method of claim 1, further comprising, accepting a modification to the at least one component.

10. The method of claim 9, further comprising saving the modified at least one component.

11. The method of claim 1, further comprising displaying the original hosting file containing the update to the at least one component.

12. A system for editing a component within an original hosting file, the system comprising:

a computing device;

a hosting file editor having specific editing features for editing the original hosting file and the component within the original hosting file, the original hosting file associated with a hosting context, the component comprising a re-usable block of programming code associated with a component context and created by a component editor, wherein the original hosting file and the component are separately editable by the hosting file editor and the hosting file editor provides all of the specific editing features for editing the component; and a non-persistable first holding element for wrapping the original hosting file during editing of the component, and wherein the component is edited, without creating a sub-document, through a same instance of the original hosting file that provides all of the specific editing features available in the original hosting file for editing the component, and wherein the original hosting file is hidden during editing of the component, wherein upon closing the hosting file editor, an updated component is generated that replaces the component in the original hosting file, the updated component being visible in the original hosting file.

13. The system of claim 12, wherein the editor for editing the component within the hosting file further comprises:
   means for accessing the component; and
   means for accessing the hosting file.

14. The system of claim 13, wherein the means for accessing the hosting file further comprises:
   means for creating a first holding element to hold the hosting file; and
   means for hiding the first holding element.

15. The system of claim 14, wherein the means for accessing the component further comprises:
   means for creating an editing frame to hold the component;
   means for changing a modifiable section of the component;
   means for initializing the editing frame;
   means for loading a read/write section of the editing frame with data associated with the component; and
   means for saving the modifiable section of the component.

16. A computer-readable storage medium including computer-readable instructions for:
   accessing a first original file, the first original file associated with a host context and a host file editor having specific editing features for editing the first original file, the first original file including at least one component hosted within the first original file, the at least one component comprising a re-usable block of programming code associated with a component context and created by a component editor, wherein the first original file and the at least one component are separately edited and the host file editor provides all of the specific editing features available in the first original file for editing the at least one component;
   storing the first original file in a first non-persistable holding element;
   selecting the at least one component on which to perform an editing operation;
   storing the at least one component on which to perform the editing operation in a second non-persistable holding element; and
   performing the editing operation on the at least one component on which to perform the editing operation in the first original file, wherein creation of a sub-document is avoided in editing the at least one component, and wherein the first original file is hidden during editing of the at least one component; wherein upon closing the host file editor, the at least one component is updated and used to replace the at least one component in the original first file, the updated at least one component being visible in the original first file.

* * * * *